United States Patent
Yu et al.

(10) Patent No.: US 10,153,518 B2
(45) Date of Patent: Dec. 11, 2018

(54) NONAQUEOUS ELECTROLYTE LITHIUM SECONDARY BATTERY

(71) Applicant: LG Chem, Ltd., Seoul (KR)

(72) Inventors: Sung-Hoon Yu, Daejeon (KR); Doo-Kyung Yang, Daejeon (KR); Min-Hyung Lee, Daejeon (KR); Jong-Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 202 days.

(21) Appl. No.: 15/109,299

(22) PCT Filed: Sep. 30, 2015

(86) PCT No.: PCT/KR2015/010316
§ 371 (c)(1),
(2) Date: Jun. 30, 2016

(87) PCT Pub. No.: WO2016/052996
PCT Pub. Date: Apr. 7, 2016

(65) Prior Publication Data
US 2016/0322668 A1  Nov. 3, 2016

(30) Foreign Application Priority Data
Sep. 30, 2014  (KR) .................. 10-2014-0131949

(51) Int. Cl.
| | |
|---|---|
| *H01M 10/0569* | (2010.01) |
| *H01M 4/505* | (2010.01) |
| *H01M 4/525* | (2010.01) |
| *H01M 10/0567* | (2010.01) |
| *H01M 4/131* | (2010.01) |
| *H01M 4/50* | (2010.01) |
| *H01M 4/52* | (2010.01) |
| *H01M 10/0525* | (2010.01) |

(52) U.S. Cl.
CPC ....... *H01M 10/0569* (2013.01); *H01M 4/131* (2013.01); *H01M 4/502* (2013.01); *H01M 4/505* (2013.01); *H01M 4/523* (2013.01); *H01M 4/525* (2013.01); *H01M 10/0525* (2013.01); *H01M 10/0567* (2013.01); *H01M 2220/20* (2013.01); *H01M 2220/30* (2013.01); *H01M 2300/004* (2013.01); *Y02T 10/7011* (2013.01)

(58) Field of Classification Search
CPC ........ H01M 10/0569; H01M 10/0567; H01M 10/0525; H01M 4/505; H01M 4/525; H01M 4/131; H01M 4/502; H01M 4/523; H01M 2220/20; H01M 2220/30; H01M 2300/004; Y02T 10/7011
See application file for complete search history.

(56) References Cited

U.S. PATENT DOCUMENTS

| | | | |
|---|---|---|---|
| 2007/0037063 A1 | 2/2007 | Choi et al. | |
| 2009/0253044 A1 | 10/2009 | Nogi et al. | |
| 2010/0266904 A1 | 10/2010 | Jeon et al. | |
| 2010/0310934 A1 | 12/2010 | Yang et al. | |
| 2011/0223490 A1 | 9/2011 | Andou et al. | |
| 2012/0183865 A1 | 7/2012 | Deguchi | |
| 2013/0252113 A1 | 9/2013 | Yu et al. | |
| 2013/0295468 A1 | 11/2013 | Yu et al. | |
| 2014/0255743 A1 | 9/2014 | Kwon et al. | |

FOREIGN PATENT DOCUMENTS

| | | |
|---|---|---|
| EP | 2720307 A2 | 4/2014 |
| JP | 2010282967 A | 12/2010 |

(Continued)

OTHER PUBLICATIONS

Supplementary European Search Report for Application No. EP15846518 dated Jun. 29, 2017.

(Continued)

*Primary Examiner* — Laura Weiner
(74) *Attorney, Agent, or Firm* — Lerner, David, Littenberg, Krumholz & Mentlik, LLP

(57) ABSTRACT

Disclosed is a lithium secondary battery including a positive electrode, a negative electrode, a separator and a nonaqueous electrolyte, wherein the positive electrode includes $Li_aNi_xMn_yCo_zO_2$ ($a+x+y+z=2$, $0.9\le a\le 1.1$, $0\le x$, $0\le y$, $0\le z$) as a positive electrode active material, and wherein the nonaqueous electrolyte includes (i) fluorinated cyclic carbonate expressed by Chemical Formula 1 below, (ii) propionate-based ester expressed by Chemical Formula 2 below, and (iii) non-halogenated carbonate, so that a mixture weight ratio (i:ii) thereof is 20:80 to 50:50:

[Chemical Formula 1]

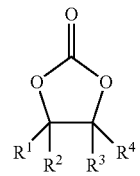

wherein, in Chemical Formula 1, $R^1$, $R^2$, $R^3$ and $R^4$ are independently any one of F, H and methyl group, and at least one thereof is F,

[Chemical Formula 2]

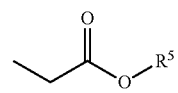

wherein, in Chemical Formula 2, $R^5$ is alkyl group having 1 to 5 carbons.

5 Claims, 2 Drawing Sheets

(56) References Cited

FOREIGN PATENT DOCUMENTS

| | | |
|---|---|---|
| JP | 2014523101 A | 9/2014 |
| KR | 1020070006955 A | 1/2007 |
| KR | 1020080053405 A | 6/2008 |
| KR | 1020090027574 A | 3/2009 |
| KR | 1020110102831 A | 9/2011 |
| KR | 1020120064683 A | 6/2012 |
| KR | 20130003884 A | 1/2013 |
| KR | 20130118769 A | 10/2013 |

OTHER PUBLICATIONS

International Search Report for Application No. PCT/KR2015/010316 dated Feb. 3, 2016.

NONAQUEOUS ELECTROLYTE LITHIUM SECONDARY BATTERY

CROSS-REFERENCE TO RELATED APPLICATION

This application is a national phase entry under 35 U.S.C. § 371 of International Application No. PCT/KR2015/010316, filed Sep. 30, 2015, which claims priority to Korean Patent Application No. 10-2014-0131949, filed Sep. 30, 2014, the disclosures of which are incorporated herein by reference.

TECHNICAL FIELD

The present disclosure relates to a nonaqueous electrolyte lithium secondary battery, and more particularly, to a lithium secondary battery using a high charging voltage and having improved stability.

BACKGROUND ART

As the energy storage technique is extensively applied to cellular phones, camcorders, notebooks and electric vehicles, high energy density is demanded to the battery used as a power source of such an electric device. A lithium secondary battery is a battery capable of meeting such a requirement best and is being actively studied.

Lithium secondary batteries developed in the early 1990's are made up of a negative electrode of a carbon-based material capable of intercalating and deintercalating lithium ions, a positive electrode made of lithium-containing oxide, and a nonaqueous electrolyte containing a proper amount of lithium salts dissolved in a mixed organic solvent.

The average discharge voltage of the lithium secondary battery is about 3.6 to 3.7 V, which is higher than those of alkali batteries, nickel-cadmium batteries or the like. For such a high operating voltage, an electrolytic composition electrochemically stable in a charge/discharge range of 0 to 4.2 V is required. For this, a mixed solvent where a cyclic carbonate compound such as ethylene carbonate and propylene carbonate and a linear carbonate compound such as dimethyl carbonate, ethylmethyl carbonate and diethyl carbonate are appropriately mixed is used as a solvent of the electrolyte. A solute of the electrolyte commonly uses a lithium salt such as $LiPF_6$, $LiBF_4$, $LiClO_4$ or the like, which serves as a lithium ion source in a battery and thus enables the lithium battery to operate.

In particular, in recent years, due to the tendency for a light, thin, short and small design of an electronic product and the increase of power consumption, a lithium secondary battery used as an energy source of such an electronic device has larger capacity. Large capacity of a lithium secondary battery may be obtained by using a high-capacity active material, increasing a capacity by raising a charging voltage or utilizing an inner space more efficiently. However, if a nickel-based ternary-system positive electrode material spotlighted in these days is used to raise a charging voltage, decomposition reaction may abruptly occur at the electrolyte, which may deteriorate battery performance such as life cycle. This phenomenon may become worse depending on service environment, and if the service temperature increases, the deterioration of battery performance becomes rapidly increasing. In addition, an electrode density tends to gradually increase in line with the tendency of maximizing utilization of a battery inner space, and this demands an electrolyte with low viscosity and high ion conductivity.

However, an electrolyte having such characteristics generally has bad stability against oxidation reaction.

DISCLOSURE

Technical Problem

The present disclosure is designed to solve the problems of the related art, and therefore the present disclosure is directed to providing a lithium secondary battery, which includes a nickel-based ternary-system positive electrode material and uses a high charging voltage to ensure improved stability.

Technical Solution

In one aspect of the present disclosure, there is provided a lithium secondary battery, including a positive electrode, a negative electrode, a separator and a nonaqueous electrolyte, wherein the positive electrode includes $Li_aNi_xMn_yCo_zO_2$ (a+x+y+z=2, 0.9≤a≤1.1, 0≤x, 0≤y, 0≤z) as a positive electrode active material, and wherein the nonaqueous electrolyte includes (i) fluorinated cyclic carbonate expressed by Chemical Formula 1 below, (ii) propionate-based ester expressed by Chemical Formula 2 below, and (iii) non-halogenated carbonate, so that a mixture weight ratio (i:ii) thereof is 20:80 to 50:50:

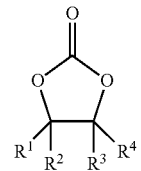

[Chemical Formula 1]

wherein, in Chemical Formula 1, $R^1$, $R^2$, $R^3$ and $R^4$ are independently any one of F, H and methyl group, and at least one thereof is F,

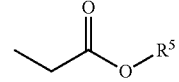

[Chemical Formula 2]

wherein, in Chemical Formula 2, $R^5$ is alkyl group having 1 to 5 carbons.

The propionate-based ester expressed by Chemical Formula 2 may employ methyl propionate, ethyl propionate or propyl propionate, without being specially limited thereto.

In addition, the content of $Li_aNi_xMn_yCo_zO_2$ (a+x+y+z=2, 0.9≤a≤1.1, 0≤x, 0≤y, 0≤z) serving as a positive electrode active material may be 50 to 100 wt % in comparison to the entire weight of the positive electrode active material.

Further, $Li_aNi_xMn_yCo_zO_2$ (a+x+y+z=2, 0.9≤a≤1.1, 0≤x, 0≤y, 0≤z) serving as a positive electrode active material may be $Li_aNi_xMn_yCo_zO_2$ (a+x+y+z=2, 0.9≤a≤1.1, 0≤x, 0≤y, 0≤z), and the positive electrode may further include $LiCoO_2$.

In addition, the positive electrode may have a loading amount of 0.01 g/cm² to 0.03 g/cm².

The content of non-halogenated carbonate may be 10 wt % or below in comparison to the entire weight of the nonaqueous electrolyte.

The non-halogenated carbonate may be any one compound selected from the group consisting of propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, ethylmethyl carbonate (EMC), and mixtures thereof, without being specially limited thereto.

In addition, the lithium secondary battery may have a charging voltage of 4.3 to 5.0 V.

Advantageous Effects

The lithium secondary battery according to the present disclosure may ensure stability of an electrolyte even though a loading amount of a positive electrode is increased to implement a high-voltage battery system, thereby allowing excellent cycle characteristics of the battery. In addition, it is possible to prevent degradation of the battery performance at high-temperature storage.

BEST MODE

Figure 1:
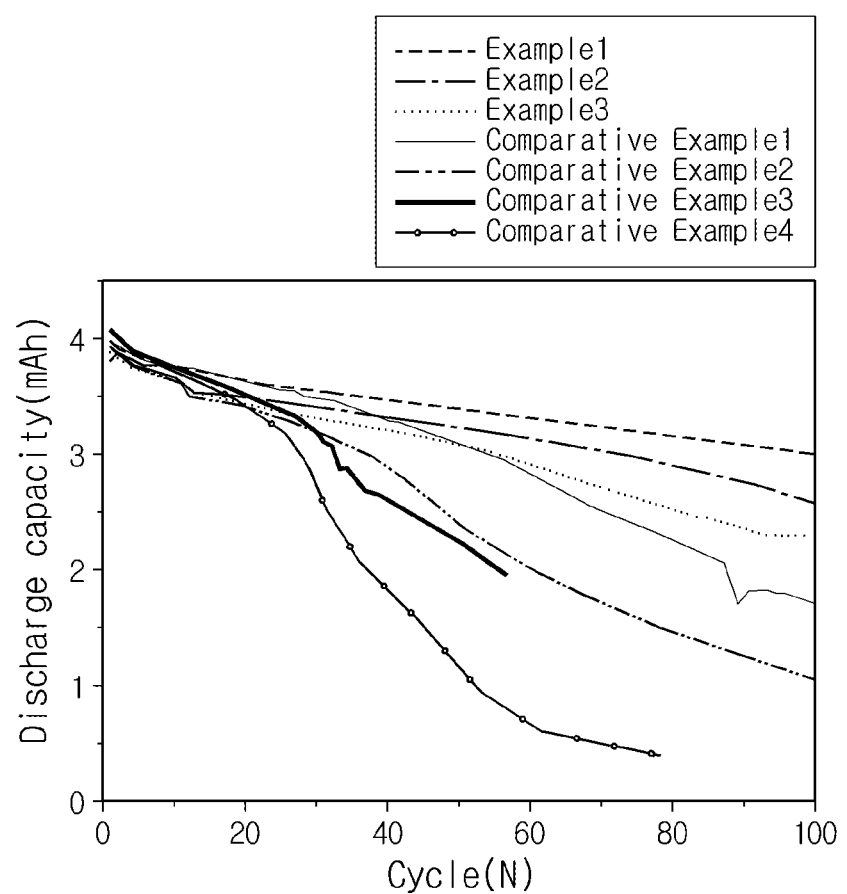
FIG. 1 is a graph showing evaluation results of life performance of batteries prepared according to Examples 1 to 3 and Comparative Examples 1 to 4.

Hereinafter, preferred embodiments of the present disclosure will be described in detail with reference to the accompanying drawings, Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As described above, a lithium secondary battery generally includes a negative electrode made of a carbon material capable of intercalating and deintercalating lithium ions, a positive electrode made of lithium-containing oxide, and a nonaqueous electrolyte.

In the lithium secondary battery of the present disclosure, the positive electrode includes $Li_aNi_xMn_yCo_zO_2$ (a+x+y+z=2, 0.9≤a≤1.1, 0≤x, 0≤y, 0≤z) serving as a positive electrode active material, and the nonaqueous electrolyte includes (i) fluorinated cyclic carbonate expressed by Chemical Formula 1 below, (ii) propionate-based ester expressed by Chemical Formula 2 below, and (iii) non-halogenated carbonate, so that a mixture weight ratio (i:ii) thereof is 20:80 to 50:50:

[Chemical Formula 1]

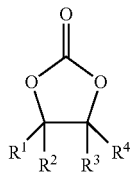

wherein, in Chemical Formula 1, $R^1$, $R^2$, $R^3$ and $R^4$ are independently any one of F, H and methyl group, and at least one thereof is F,

[Chemical Formula 2]

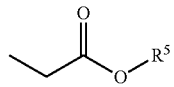

wherein, in Chemical Formula 2, $R^5$ is alkyl group having 1 to 5 carbons.

In the present disclosure, the positive electrode includes $Li_aNi_xMn_yCo_zO_2$ (a+x+y+z=2, 0.9≤a≤1.1, 0≤x, 0≤y, 0≤z) as a positive electrode active material, and $Li_aNi_xMn_yCo_zO_2$ (a+x+y+z=2, 0.9≤a≤1.1, 0≤x, 0≤y, 0≤z) serving as a positive electrode active material may be any one selected from the group consisting of $LiCoO_2$, $LiNiO_2$, $LiMnO_2$, $LiMn_2O_4$, $LiNi_{1-y}Co_yO_2$ (0<y<1), $LiCo_{1-y}Mn_yO_2$ (0<y<1), $LiNi_{1-y}Mn_yO_2$ (0≤y<1), $Li_aNi_xMn_yCo_zO_2$ (a+x+y+z=2, 0.9≤a≤1.1, 0<x, 0<y, 0<z), or mixtures thereof, without being limited thereto.

In addition, in an embodiment, the positive electrode includes an Ni-containing ternary-system positive electrode active material serving as $Li_aNi_xMn_yCo_zO_2$ (a+x+y+z=2, 0.9≤a≤1.1, 0<x, 0<y, 0<z), and this is a lithium transition metal oxide obtained by substituting a part of nickel in $LiNiO_2$ with other transition metal such as manganese, cobalt or the like and is relatively excellent in cycle characteristics and capacity characteristics.

At this time, the positive electrode may further include $LiCoO_2$ in addition to the Ni-containing ternary-system positive electrode active material serving as $Li_aNi_xMn_yCo_zO_2$ (a+x+y+z=2, 0.9≤a≤1.1, 0<x, 0<y, 0<z).

In detail, the positive electrode active material according to an embodiment of the present disclosure includes $LiCoO_2$ and a lithium-containing transition metal compound expressed by Chemical Formula 3 below, and the lithium-containing transition metal compound having a composition expressed by Chemical Formula 3 intercalates or deintercalates lithium ions between lithium-containing transition metal oxide layers ('MO layers'). Also, in the lithium ion intercalating and deintercalating layer (a 'reversible lithium layer'), Ni ions originating from the MO layers are inserted to couple the MO layers to each other, and the Ni ions inserted into and coupled in the reversible lithium layer may have a mol fraction of 0.03 to 0.07 on the entire amount of Ni.

$Li_xM_yO_2$  [Chemical Formula 3]

In Chemical Formula 3, M represents $M'_{1-k}A_k$, where M' is $Ni_{1-a-b}(Ni_{1/2}Mn_{1/2})_aCo_b$, 0.65≤a+b≤0.85 and 0.1≤b≤0.4, and where A represents a dopant, 0≤k<0.05, x+y≈2 and 0.95≤x≤1.05.

In the MO layer, $Ni^{2+}$ and $Ni^{3+}$ coexist, among which a part of $Ni^{2+}$ may be inserted into the reversible lithium layer. Here, since $Ni^{2+}$ inserted into the reversible lithium layer may prevent a crystal structure from being unstable due to a repulsive force among oxygen particles in the MO layer during charging, the crystal structure becomes stabilized. Accordingly, additional structure collapse caused by oxygen separation does not occur, and even though lithium is emitted during the charging process, Ni ions inserted into the reversible lithium layer keeps its oxidation number so that $Ni^{2+}$ is not generated any more, thereby improving life characteristics and stability simultaneously.

In the lithium-containing transition metal compound of Chemical Formula 3, $Ni_{1-a-b}$ represents the content of $Ni^{3+}$. If the mol fraction of $Ni^{3+}$ exceeds 0.35 (a+b<0.65), it is impossible to perform mass production in the air by using $Li_2Co_3$ as a source, and LiOH should be used as a source under the oxygen atmosphere. If LiOH is used as a lithium source, production efficiency is deteriorated to resultantly increase production costs since LiOH is more expensive than $Li_2Co_3$ and is not easily handled.

Meanwhile, if the content of $Ni^{3+}$ is smaller than 0.15 (a+b>0.85), the capacity of $LiMnO_2$ per volume is small and thus has no competitiveness in comparison to $LiCoO_2$. In addition, in $LiMnO_2$, the entire mol fraction of Ni including $Ni^{2+}$ and $Ni^{3+}$ may be 0.4 to 0.7. If the content of Ni is smaller than 0.4, high capacity is hardly expected, and if the content of Ni is greater than 0.7, stability may be greatly deteriorated. The mol fraction of manganese is 0.05 to 0.4, and the mol fraction of cobalt is 0.1 to 0.4.

In addition, if the mol fraction of $Ni^{2+}$ with respect to the content of Ni is too high, an amount of mixed cations increases, thereby locally forming a rock-salt structure with no electrochemical reaction, which may disturb charging and discharging and accordingly reduce discharge capacity. Meanwhile, if the mol fraction of $Ni^{2+}$ is too low, structural instability increases, which may deteriorate cycle stability. Therefore, the mol fraction of $Ni^{2+}$ with respect to the entire amount of Ni may be 0.05 to 0.4.

In addition, the positive electrode according to an embodiment of the present disclosure may further include any one selected from the group consisting of $LiMn_{2-z}Ni_zO_4$ (0<z<2), $LiMn_{2-z}Co_zO_4$ (0<z<2), $LiCoPO_4$, $LiFePO_4$, or mixtures thereof, as a positive electrode active material, without being limited thereto.

The positive electrode according to an embodiment of the present disclosure may include 50 to 100 wt % of $Li_aNi_x$-$Mn_yCo_zO_2$ (a+x+y+z=2, 0.9≤a≤1.1, 0≤x, 0≤y, 0≤z) serving as a positive electrode active material, in comparison to the entire positive electrode active material.

In addition, in the lithium secondary battery of the present disclosure, the positive electrode may have a loading amount of 0.01 $g/cm^2$ to 0.03 $g/cm^2$, and in particular, in order to implement a high-voltage battery system, the positive electrode may have a loading amount of 0.02 $g/cm^2$ to 0.03 $g/cm^2$.

Meanwhile, $Li_aNi_xMn_yCo_zO_2$ (a+x+y+z=2, 0.9≤a≤1.1, 0≤x, 0≤y, 0≤z) serving as a positive electrode active material has relatively high resistance, and thus if a density is increased in use, it is not easy to ensure sufficient capacity, and decomposition reactions of the electrolyte are promoted in a high-voltage system. Therefore, it is particularly important to use a suitable electrolyte.

The nonaqueous electrolyte of the present disclosure includes fluorinated cyclic carbonate expressed by Chemical Formula 1, propionate-based ester expressed by Chemical Formula 2, and non-halogenated carbonate.

The fluorinated cyclic carbonate may suppress a decomposition reaction of a solvent in the negative electrode. During initial charging of the lithium secondary battery, lithium ions react with carbon of the electrolyte and the negative electrode active material at the surface of a negative electrode active material such as graphite to generate a compound such as $Li_2CO_3$, $Li_2O$, LiOH or the like, thereby forming a kind of solid electrolyte interface (SET) film on the surface of the negative electrode active material. The SEI film plays a role of an ion tunnel to allow only lithium ions to pass, thereby preventing the electrolyte from contacting the negative electrode active material and thus preventing decomposition of the electrolyte. However, if the battery is left alone at high temperature in a fully-charged state, as time goes, the SEI film is slowly collapsed due to the increased electrochemical energy and thermal energy, thereby continuously causing side reactions where the exposed surface of the negative electrode reacts with surrounding electrolyte. However, the SEI film is one of main factors which changes the performance of a battery by giving an influence on movement of ions and charges, and it is known that the properties of the SEI film are greatly varied depending on the kind of solvent used as the electrolyte and the characteristics of additives. However, the fluorinated cyclic carbonate of the present disclosure reduces collapse of the SEI film, and thus the decomposition reaction of the solvent in the negative electrode may be suppressed. The SEI film formed by reduction and decomposition at the negative electrode has a relatively thin and dense design, which may improve the performance of the battery, particularly improves charging/discharging performance of the battery at normal temperature. It is guessed that this effect is obtained since the fluorinated cyclic carbonate is reduced during initial charging of the battery and also the SEI film is formed to have a single layer or multi layers by means of replicative or crosslinking polymerization to have a firmer and denser design, without being limited thereto.

The propionate-based ester of the present disclosure has a low freezing point, a relatively high boiling point and low reactivity against the negative electrode. Therefore, the propionate-based ester of the present disclosure exhibits excellent low-temperature characteristics and may contribute to improvement of high-temperature characteristics of the battery. The propionate-based ester may employ methyl propionate, ethyl propionate, propyl propionate or the like, among which methyl propionate is preferred. At this time, the reactivity against the negative electrode at the high-voltage system is very low.

The nonaqueous electrolyte of the present disclosure includes (i) fluorinated cyclic carbonate, (ii) propionate-based ester, and (iii) non-halogenated carbonate, so that a mixture weight ratio (i:ii) is 20:80 to 50:50.

If the fluorinated cyclic carbonate is less than 20 weight ratio, in the negative electrode, the effect of suppressing decomposition reactions of the solvent is insignificant, and propionate-based ester is used excessively, thereby deteriorating high-rate charging/discharging characteristics. In addition, if the fluorinated cyclic carbonate is greater than 50 weight ratio, due to high viscosity, wettability and ion conductivity are low, and since propionate-based ester is used in a small amount, low-temperature characteristics are deteriorated.

The electrolyte of the present disclosure lowers viscosity and increases ion conductivity by using non-halogenated carbonate together, thereby improving charging/discharging performance. The non-halogenated carbonate included in the electrolyte of the present disclosure may use any non-halogenated carbonate compound which is commonly used in a nonaqueous electrolyte of a lithium secondary battery, and such a carbonate-based compound may employ propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, ethylmethyl carbonate (EMC) or the like solely or as a mixture thereof, without being limited thereto. In addition, at this time, the content of the non-halogenated carbonate may be 10 wt % or below in comparison to the entire weight of the nonaqueous electrolyte, and its lower limit may be 0.1 wt % or above, without being limited thereto. If the content of the non-halogenated carbonate exceeds 10 wt %, further improvement of the effect is not expected in proportion to the increase of the content. An electrolyte is commonly selected to have a composition for optimizing properties such as solubility, viscosity and ion conductivity, and it is common to use 20 wt % to 40 wt % of cyclic carbonate which is helpful for improving solubility and ion conductivity and 60 wt % to 80 wt % of linear carbonate or linear ester which is helpful for lowering viscosity. Regarding the limited content ratio as above, if the content of the non-halogenated carbonate exceeds 10 wt %, the content of fluorinated cyclic carbonate and propionate-based ester giving the effects of the present disclosure is lowered, thereby giving insufficient effects.

In the nonaqueous electrolyte of the lithium secondary battery according to the present disclosure, a lithium salt included as the electrolyte may employ any electrolyte commonly used for lithium secondary batteries, without limitation, and the lithium salt may representatively employ $LiPF_6$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ or the like. In addition, in the nonaqueous electrolyte of the lithium secondary battery, compounds such as lactone, ether, ester, acetonitrile, lactam, ketone or the like may be further included without damaging the object of the present disclosure.

The negative electrode made of carbon material capable of intercalating and deintercalating lithium ions and the positive electrode made of lithium-containing oxide, employed in the lithium secondary battery of the present disclosure, may employ any one commonly used for manufacturing lithium secondary batteries.

In addition, for example, the carbon material capable of intercalating and deintercalating lithium ions may use any of low-crystalline carbon and high-crystalline carbon. The low-crystalline carbon is representatively soft carbon and or hard carbon, and the high-crystalline carbon is representatively natural graphite, Kish graphite, pyrolytic carbon, mesophase pitch based carbon fiber, meso-carbon microbeads, mesophase pitches, and high-temperature calcined carbon such as petroleum or coal tar pitch derived cokes. At this time, the negative electrode may include a binding agent, which may employ various kinds of binders, for example acrylic binders such as polyvinylidenefluoride-hexafluoropropylene copolymer (PVDF-co-HFP copolymer), polyvinylidene fluoride, polyacrylonitrile and polymethyl methacrylate (polymethyl methacrylate), styrene-butadiene rubber (SBR) copolymer, and reformed styrene butadiene copolymer.

The kind of binder employed in the present disclosure may be variously changed depending on a specific surface area of the negative electrode. In particular, an organic binder such as polyvinylidene fluorides (PVDFs) may be applied to a negative electrode having a small specific surface area of about 1.5 $m^2/g$ or less, particularly about 0.5 $m^2/g$ to about 1.5 $m^2/g$. Meanwhile, an aqueous binder such as styrene butadiene rubbers (SBRs) may be applied to a negative electrode having a large specific surface area of about 1.5 $m^2/g$ or above, particularly about 1.5 $m^2/g$ to about 4.5 $m^2/g$. As the negative electrode has a greater specific surface area, a linear ester compound reacts with the negative electrode active material much more. As a result, the use of a PVDF-based binder may cause reducing side reactions allowable between the negative electrode and the linear ester compound. However, the SBR-based binder promotes excessive reducing reactions between them. These side reactions progress faster at high temperature and deteriorate the performance of the battery. Therefore, a secondary battery manufactured using an aqueous binder requires a negative electrode restrainer in order to prevent the side reaction.

In addition, a separator is generally interposed between the positive electrode and the negative electrode, and the separator may employ a common porous polymer film used as an existing separator, for example porous polymer films made of polyolefin-based polymers such as ethylene homopolymer, propylene homopolymer, ethylene/butene copolymer, ethylene/hexene copolymer, ethylene/methacrylate copolymer or the like, solely or as a laminate thereof. In addition, a common porous non-woven fabric, for example a non-woven fabric made of glass fiber or polyethylene terephthalate fiber with a high melting point may be used, without being limited thereto.

The lithium secondary battery of the present disclosure may have any appearance, without limitation, but may have a cylindrical shape using a can, a rectangular shape, a pouch shape or a coin shape.

In addition, the lithium secondary battery of the present disclosure is suitable for a high-voltage charging system having a charging voltage of 4.3 to 5.0 V.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

EXAMPLES

Example 1

<Preparation of a Nonaqueous Electrolyte>

A 1M $LiPF_6$ solution having a composition where fluoroethylene carbonate (FEC):propylene carbonate (PC):methyl propionate (MP) is 30:10:60 (weight ratio) was prepared as an electrolyte.

<Preparation of a Battery>

$Li(Ni_aCo_bMn_c)O_2$ (a=0.8, b=0.1 c=0.1) serving as a positive electrode active material, polyvinylidene fluoride (PVdF) serving as a binder, and carbon serving as a conductive material were mixed at a weight ratio of 93:4:4, and then dispersed in N-methyl-2-pyrrolidone to prepare positive electrode slurry. The slurry was coated to an aluminum current collector with a loading amount of 0.02 $g/cm^2$, then dried and roll-pressed to prepare a positive electrode.

In addition, natural graphite serving as a negative electrode active material, styrene-butadiene rubber serving as a binder, and carboxymethyl cellulose serving as a viscosity agent were mixed at a 96:2:2 of weight ratio, and then dispersed in water to prepare negative electrode slurry. The slurry was coated to a copper current collector, then dried and roll-pressed to prepare a negative electrode.

After that, a coin-type battery was prepared in a common way by using the prepared positive electrode and the prepared negative electrode together with a PE separator, and then the prepared electrolyte was injected thereto to completely manufacture a battery.

Example 2

A battery was manufactured in the same way as Example 1, except that ethyl propionate (EP) was used instead of methyl propionate (MP), when the nonaqueous electrolyte was prepared.

Example 3

A battery was manufactured in the same way as Example 1, except that a composition where fluoroethylene carbonate (FEC):methyl propionate (MP):dimethyl carbonate (DMC) was 20:70:10 (weight ratio) was used, when the nonaqueous electrolyte was prepared.

Example 4

<Preparation of a Nonaqueous Electrolyte>

A 1M $LiPF_6$ solution having a composition where fluoroethylene carbonate (FEC):ethylene carbonate (EC):methyl propionate (MP)=14.5:19.2:66.3 (weight ratio) was prepared as an electrolyte.

<Preparation of a Battery>

$Li(Ni_aCo_bMn_c)O_2$ (a=0.8, b=0.1 c=0.1) serving as a positive electrode active material, polyvinylidene fluoride (PVdF) serving as a binder, and carbon serving as a conductive material were mixed at a weight ratio of 93:4:4, and then dispersed in N-methyl-2-pyrrolidone to prepare positive electrode slurry. The slurry was coated to an aluminum current collector with a loading amount of 0.02 $g/cm^2$, then dried and roll-pressed to prepare a positive electrode.

In addition, natural graphite serving as a negative electrode active material, styrene-butadiene rubber serving as a binder, and carboxymethyl cellulose serving as a viscosity agent were mixed at a 96:2:2 of weight ratio, and then dispersed in water to prepare negative electrode slurry. The slurry was coated to a copper current collector, then dried and roll-pressed to prepare a negative electrode.

After that, a cylindrical battery was prepared in a common way by using the prepared positive electrode and the prepared negative electrode together with a PE separator, and then the prepared electrolyte was injected thereto to completely manufacture a battery.

Comparative Example 1

A battery was manufactured in the same way as Example 1, except that a composition where ethylene carbonate (EC):propylene carbonate (PC):methyl propionate (MP)=30:10:60 (weight ratio) was used, when the nonaqueous electrolyte was prepared.

Comparative Example 2

A battery was manufactured in the same way as Example 1, except that a composition where fluoroethylene carbonate (FEC):propylene carbonate (PC):methyl butyrate (MB)=30:10:60 (weight ratio) was used, when the nonaqueous electrolyte was prepared.

Comparative Example 3

A battery was manufactured in the same way as Example 1, except that a composition where fluoroethylene carbonate (FEC):methyl propionate (MP):dimethyl carbonate (DMC)=9:81:10 (weight ratio) was used, when the nonaqueous electrolyte was prepared.

Comparative Example 4

A battery was manufactured in the same way as Example 1, except that a composition where fluoroethylene carbonate (FEC):methyl propionate (MP):dimethyl carbonate (DMC)=54:36:10 (weight ratio) was used, when the nonaqueous electrolyte was prepared.

Comparative Example 5

A battery was manufactured in the same way as Example 1, except that a composition where fluoroethylene carbonate (FEC):ethylene carbonate (EC):methyl propionate (MP)=14.5:19.2:66.3 (weight ratio) was used, when the nonaqueous electrolyte was prepared.

Experimental Example 1

Evaluation of Life Performance

The batteries (with a battery capacity of 4.3 mAh) prepared according to Examples 1 to 3 and Comparative Examples 1 to 4 were charged at 60° C. with a constant current of 0.7 C up to 4.3V, and then charged with a constant voltage of 4.3V. The charging was terminated if the charging current becomes 0.215 mA. After that, the batteries were left along for 10 minutes and discharged with a constant current of 0.5 C down to 3.0V. A discharge capacity was measured while repeating the charging/discharging processes. The measurement results are shown in FIG. 1.

Figure 2:
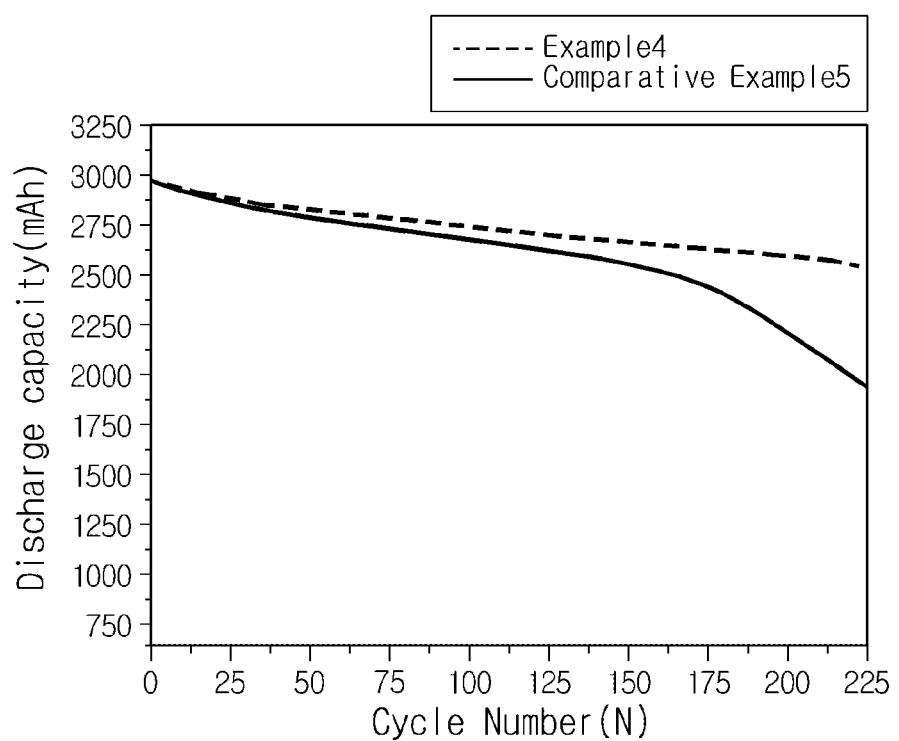
FIG. 2 is a graph showing evaluation results of life performance of batteries prepared according to Example 4 and Comparative Example 5.

In addition, for the batteries (with a battery capacity of 4.3 mAh) prepared according to Example 4 and Comparative Example 5, a discharge capacity was measured in the same way. The measurement results are shown in FIG. 2.

Experimental Example 2

Evaluation of High-Temperature Storage Performance

The batteries (with a battery capacity of 4.3 mAh) prepared according to Examples 1 to 3 and Comparative Examples 1 to 4 were charged at 60° C. with a constant current of 0.7 C up to 4.3V, and then charged with a constant voltage of 4.3V. The charging was terminated if the charging current becomes 0.215 mA. After that, the batteries were left along at 60° C. for 1 week. After that, the batteries were discharged with a constant current of 0.5 C down to 3.0V, and a residual capacity was checked. In addition, the batteries were charged in the same way, and then left alone for 10 minutes and discharged, to measure a recovery capacity. This is expressed as a percentage in comparison to the initial capacity. The results are shown in Table 1 below.

TABLE 1

|  | Residual capacity (%) | Recovery capacity (%) |
| --- | --- | --- |
| Example 1 | 82.4 | 93.3 |
| Example 2 | 80.5 | 90.3 |
| Example 3 | 81.1 | 92.1 |
| Comparative Example 1 | 65.6 | 70.3 |
| Comparative Example 2 | 67.4 | 73.5 |
| Comparative Example 3 | 55.3 | 66.1 |
| Comparative Example 4 | 34.8 | 50.6 |

What is claimed is:

1. A lithium secondary battery, including a positive electrode, a negative electrode, a separator and a nonaqueous electrolyte,
wherein the positive electrode includes
$Li_aNi_xMn_yCo_zO_2$(a+x+y+z=2, 0.9≤a≤1.1, 0≤x, 0≤y, 0≤z), and
$LiCoO_2$, wherein a content of the $Li_aNi_xMn_yCo_zO_2$ is 50 wt % to 100 wt % in comparison to the entire weight of the positive electrode active material, and wherein the nonaqueous electrolyte includes (i) fluorinated cyclic carbonate expressed by Chemical Formula 1 below, (ii) propionate-based ester expressed by Chemical Formula 2 below, and (iii) non-halogenated carbonate, so that a mixture weight ratio (i:ii) thereof is 20:80 to 50:5, and a content of the non-halogenated carbonate is 10 wt % or below in comparison to the entire weight of the nonaqueous electrolyte,

[Chemical Formula 1]

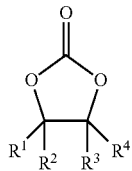

wherein, in Chemical Formula 1, $R^1$, $R^2$, $R^3$ and $R^4$ are independently any one of F, H and methyl group, and at least one thereof is F,

[Chemical Formula 2]

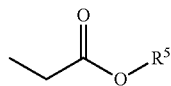

wherein, in Chemical Formula 2, $R^5$ is alkyl group having 1 to 5 carbons.

2. The lithium secondary battery according to claim 1, wherein the propionate-based ester expressed by Chemical Formula 2 is at least one of methyl propionate, ethyl propionate and propyl propionate.

3. The lithium secondary battery according to claim 1, wherein the positive electrode has a loading amount of 0.01 $g/cm^2$ to 0.03 $g/cm^2$.

4. The lithium secondary battery according to claim 1, wherein the non-halogenated carbonate is any one compound selected from the group consisting of propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, ethylmethyl carbonate (EMC), and mixtures thereof.

5. The lithium secondary battery according to claim 1, wherein the lithium secondary battery has a charging voltage of 4.3 to 5.0 V.

* * * * *